Sept. 24, 1946.   L. W. MILLER ET AL   2,408,149
APPARATUS FOR EMBEDDING AN ELONGATED FLEXIBLE
MEMBER IN A MOLDABLE MATERIAL
Filed Aug. 6, 1943   2 Sheets-Sheet 1
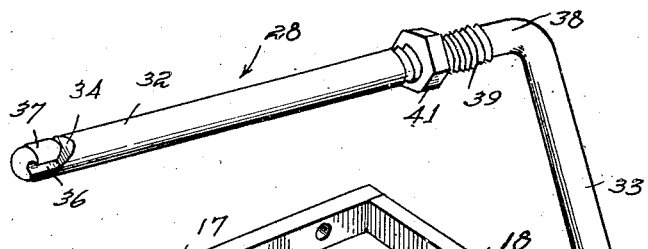
Fig.1
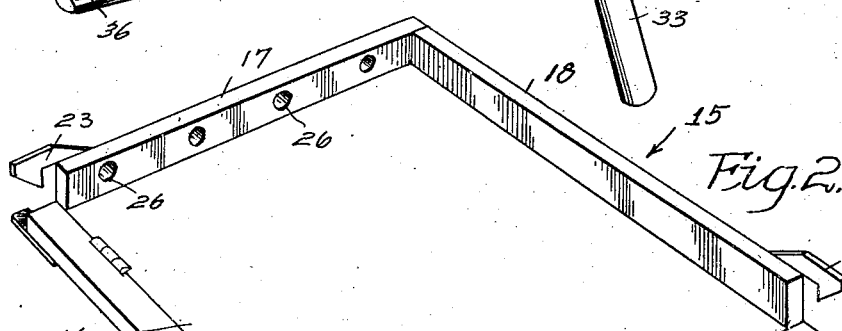
Fig.2.
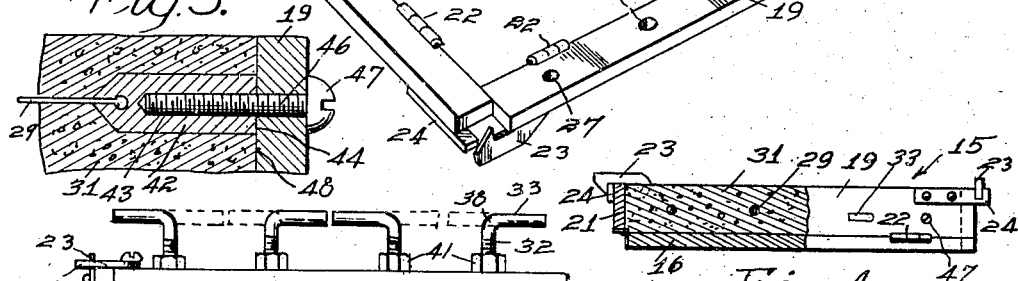
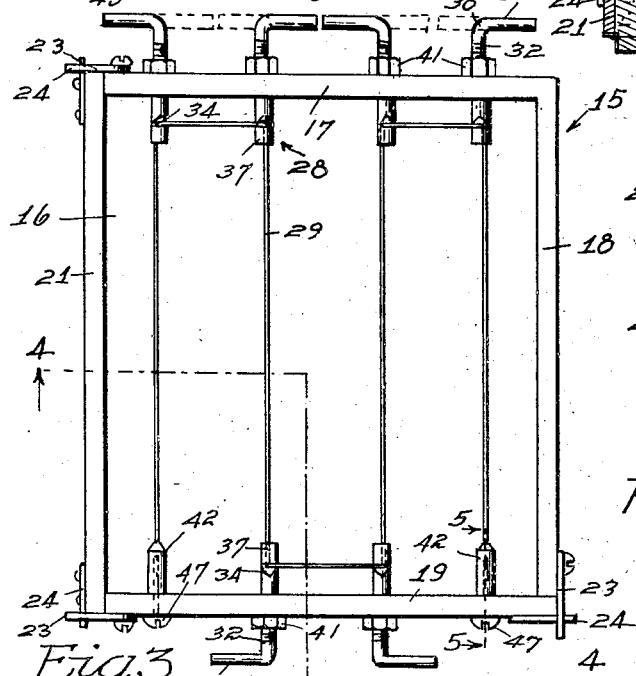
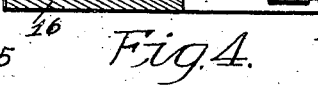
Fig.7   Fig.9.
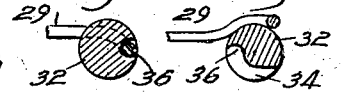
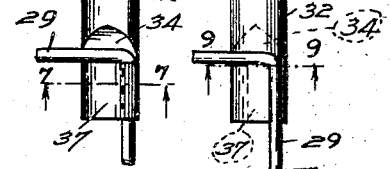
Fig.6   Fig.8.
INVENTORS.
LESLIE W. MILLER
SAMPSON DEWY MAHLSTADT
BY
Rudolph L. Lowell
Attorney Sept. 24, 1946.  L. W. MILLER ET AL  2,408,149
APPARATUS FOR EMBEDDING AN ELONGATED FLEXIBLE
MEMBER IN A MOLDABLE MATERIAL
Filed Aug. 6, 1943  2 Sheets-Sheet 2

INVENTORS
LESLIE W. MILLER
SAMPSON DEWEY MAHLSTADT
by Rudolph L. Lowell
Attorney Patented Sept. 24, 1946

2,408,149

UNITED STATES PATENT OFFICE 2,408,149

APPARATUS FOR EMBEDDING AN ELONGATED FLEXIBLE MEMBER IN A MOLDABLE MATERIAL

Leslie W. Miller and Sampson Dewey Mahlstadt, Waverly, Iowa

Application August 6, 1943, Serial No. 497,710

5 Claims. (Cl. 25—118)

1

This invention relates generally to molding apparatus and in particular to an improved apparatus for embedding an elongated flexible member in a moldable material capable of becoming solidified or hardened.

An object of this invention is to provide an improved method and molding apparatus for embedding a wire in a moldable material.

A further object of this invention is to embed an electrical conductor in a predetermined pattern in a moldable material but with portions of the conductor within the finally molded form accessible for connection with an electrical circuit outside of the molded form.

Yet another object of this invention is to provide in a molding apparatus for embedding a wire in a moldable material capable of becoming hardened, an anchoring device extended within the mold to engage and support the wire in a predetermined position but movable to a wire-releasing position and freely removable from within the mold when the moldable material is in a partially hardened state.

A still further object of this invention is to provide in a molding apparatus for embedding a wire in a moldable material an anchoring device extended within the mold through a side of the mold to engage a wire and adjustable relative to the side of the mold to tension the wire to prevent outward movement of the mold side.

A feature of this invention is found in the provision of a molding apparatus for embedding a wire in a moldable material, in which the wire-holding member has a straight length body portion which is rotatable in and loosely extendible through a side of a mold and grooved at its free end to engage the wire. The wire is supported under tension by the manipulation of adjustable means on the holding member located to the outside of the mold. By merely rotating the holding member, when the moldable material is only partially solid, the holding member is moved out of an engaging position with the wire and freely removable from the mold, with the position of the wire in the mold being retained by the moldable material.

Yet another feature of this invention is found in the provision of a molding apparatus for embedding an electrical conductor in a moldable material adapted to be hardened in which a terminal is connected to one end of the conductor and releasably supported in a mold against the inner surface of a side of the mold. On hardening of the moldable material and removal of the mold the terminal is openly located in a side of the molded form but in the plane of such side for direct connection to an outside electrical circuit.

Other objects, features and advantages of this invention will become apparent from the following description when taken in connection with the accompanying drawings in which:

Fig. 1 is a perspective view of a wire anchoring or holding device used in the molding apparatus of this invention;

Fig. 2 is a perspective view of one mold form used with this invention shown in open position and with the anchoring device in Fig. 1 removed therefrom;

Fig. 3 is a plan view of the molding apparatus of Fig. 2 in closed position and with the anchoring device in Fig. 1 assembled therewith;

Fig. 4 is an elevational view partly in section taken along the line 4—4 in Fig. 3;

Fig. 5 is a sectional detail view of a terminal-holding device as seen on the line 5—5 in Fig. 3;

Fig. 6 is a fragmentary plan view of the wire-holding device of Fig. 1 showing the wire in an engaged position therein;

Fig. 7 is a sectional view taken on the line 7—7 in Fig. 6;

Fig. 8 is a fragmentary plan view of the wire-holding device illustrated similarly to Fig. 6 showing the holding device in a wire-releasing position;

Fig. 9 is a sectional view as seen along the line 9—9 in Fig. 8;

Figure 15:
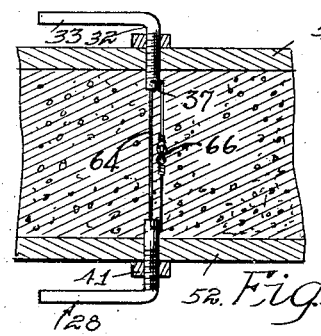
Fig. 15 is illustrated similarly to Fig. 14 and shows the use of only a pair of the anchoring devices in Fig. 1 in a wire supporting position.

Referring to Fig. 1 of the drawings one form of molding apparatus used with this invention is seen to include a mold 15 having a base 16, adjacent sideboards 17 and 18 fixed to the base and adjacent sideboards 19 and 21 hingedly connected at 22 with the base 16 for pivotal movement outwardly and downwardly from an upright mold closing position with the sides 17 and 18. The sides 19 and 21 are held in a mold-closing position by pivoted clamps or hooks 23 and corresponding catch members 24 arranged for operative connection as shown in Figs. 1 and 3.

Each one of the opposite pair of sideboards 17 and 19 is formed with longitudinally spaced openings 26. The sideboard 19 is also formed with a pair of spaced openings 27 located to each side of the spaced openings 26. Each opening 26 in the sideboards 17 and 19 is adapted to loosely and rotatably receive a corresponding holding or anchoring device 28 for a wire 29 which is to be embedded in material, designated as 31, with which the mold 15 is to be filled (Figs. 1 and 3). As illustrated in Fig. 3 the wire 29 is an electrical resistance element and the material 31 is composed of a cement or like moldable or pourable material capable of normally becoming hardened or solidified, with the molded form and resistance element 29 embedded therein constituting an electrical heating unit.

The wire-holding device 28 is of a substantially L-shape with the leg 32 being of a straight form and comprising the body of the holding device while leg 33 constitutes an actuating or manipulating member for selectively moving the holding device as will be later explained. There is formed inwardly of the free end of the body 32 a transversely extended groove 34 which is connected with a longitudinally extended groove 36 located out of the plane of the groove 34 and open at the free end of the body 32, with the grooves 34 and 36 forming a hook 37 at the end of the body 32 which is located completely within the peripheral confines of the body 32 (Fig. 1). This construction of the hook 37 provides for its engaging the resistance element 29 for one angular position of the anchor device 28, and for the release of the element 29 on rotation of the anchor 28 in one direction for a purpose which will be later explained. The body 32 adjacent its end 38 which is connected with the manipulating leg 33 is formed with an enlarged threaded section 39 adapted for threadable engagement with an adjusting nut 41.

In the use of the molding apparatus in Fig. 2 the mold 15 is closed so that all of its sides are upright, as shown in Fig. 3. The resistance element 29 is cut to a length providing for its arrangement in a continuous path from sideboards 18 and 21 and between the sideboards 17 and 19. Each end of the resistance element 29 is then connected with a terminal 42. As shown in Fig. 5 the terminal 42 is of a substantially cylindrical shape, with the resistance element 29 being suitably connected at one end while an axially extending bore 43 is formed in its opposite end 44. The bore 43 is threaded for threadable engagement with a screw member 46 adapted to be inserted through an opening 27 in the sideboard 19 with its head portion 47 in bearing engagement with the outer surface of the sideboard 19. On tightening of the screw 46 the terminal member 42 is drawn tightly against the inner surface of the side member 19 so that in the pouring of the material 31 within the mold 15 this material is prevented from entering the bore 43.

With the terminal members 42, two of which are illustrated in Fig. 3, supported on the sideboard 19 the body 32 of an anchoring device 28 is slidably extended through a corresponding opening 26 in the sideboards 17 and 19 so that the hook portion 37 is extended within the mold form 15, as shown in Fig. 3. As previously explained the hook portion 37 for each anchoring device 28 is adapted to releasably engage the resistance element 29 for one angular position of the anchoring device. When the devices 28 are in this position the resistance element 29 is strung within the hook portions 37 of each thereof and is supported under tension by the manipulation of the nuts 41 on the threaded portion 39 of the anchoring device.

Referring to Fig. 3 it is seen that when the body 32 of an anchoring device 28 is inserted within the mold 15 the threaded portion 39 is located to the outside of the mold so that the nut 41 is capable of being advanced along a corresponding threaded portion and in slidable bearing engagement with the outer surface of a sideboard 17 and 19. It is thus apparent that with an anchoring device held in a wire-engaging position rotation of the nut 41 adjustably moves a body 32 longitudinally relative to a corresponding sideboard 17 or 19 and in a direction outwardly from the mold 15. Thus oppositely arranged anchoring devices in the sideboards 17 and 19 are moved in opposite directions so as to tension the resistance element 29 supported therebetween. Because of the reverse bending of the resistance element 29 on adjacent anchoring devices 28 in a sideboard 17 and 19 the hook portions 37 on adjacent anchoring devices are of a left and a right-hand construction. To facilitate the initial angular setting of the anchoring devices 28 in a wire-engaging position it is contemplated that the manipulating legs 33 on adjacent anchoring devices 28 be located in a horizontal plane and extended in opposite directions as shown in full lines in Fig. 3.

When the molding material 31 is in a partially hardened condition each of the anchoring devices 28 is rotated in one direction about 180°, with this rotation being reversed relative to the left and right-hand anchoring devices so that the manipulating legs 33 are moved inwardly toward each other to their positions indicated by dotted lines in Fig. 3. As shown in Figs. 6 and 7 when an anchoring device is in position to engage the element 29, the element 29 is extended transversely across a body portion 32 and within the groove 34 and is then bent at substantially a right angle and downwardly from the groove 34 for reception in the longitudinal groove 36. The element 29 is thus effectively held by the hook portion 37 against release on the application of a pressure on the element in line with the grooves 34 and 36.

As shown in Figs. 8 and 9 the body portion 32 is rotated substantially 180° relative to its position in Figs. 6 and 7 and in a counter-clockwise direction as viewed in Figs. 7 and 9. This rotation of the body portion 32 positions the transverse groove 34 to the bottom of the body portion 32, as viewed in Fig. 9, and the longitudinal groove 36 to a position below and out of engagement with the resistance wire 29. As a result the grooves 34 and 36 are at the bottom of the body portion 32 so that the element 29, which is retained at the top of the body portion 32 by the partially hardened material 31 is completely out of an engaging position with the hook 37.

By virtue of the complete release of the resistance element 29 from the hook 37 the body portion 32 is capable of being freely withdrawn outwardly from the mold 15 through a corresponding opening 26. Since this withdrawal takes place when the material 31 is in a partially hardened condition the resistance element 29 is supported in its initial position by the material 31 as determined by the anchoring device 28. Further, since the material 31 is only partially hardened it is still in a moldable form and capable of closing the openings left therein by the withdrawal of the anchoring devices 28, so that when the material 31 is hardened the resistance element 29 is completely embedded within the molded form.

With the anchoring devices withdrawn from the mold 15 the material 31 is permitted to harden into its final form. When this takes place the screws 47, by which a terminal 42 is supported within the mold 15, are removed and the clamps 23 loosened to permit the mold sides 19 and 21 being swung outwardly and downwardly away from the hardened molded form. The molded form is thus able to be freely removed from the mold 15.

Because of the support of a terminal member 42 with its end 44 tightly against the inner surface of the sideboard 19 the bore 43 in the completed molded form is entirely open. Further, the terminal 42 is completely embedded within the molded form with its end 44 in the plane of the side 48 of the molded material 31 (Fig. 5). As a result direct connection of the resistance element 29 with an outside circuit (not shown) can be accomplished by merely securing a conductor of the outside circuit to the terminal 42 by a screw member similar to the screw member 46 in a manner which is believed to be obvious.

Figure 11:
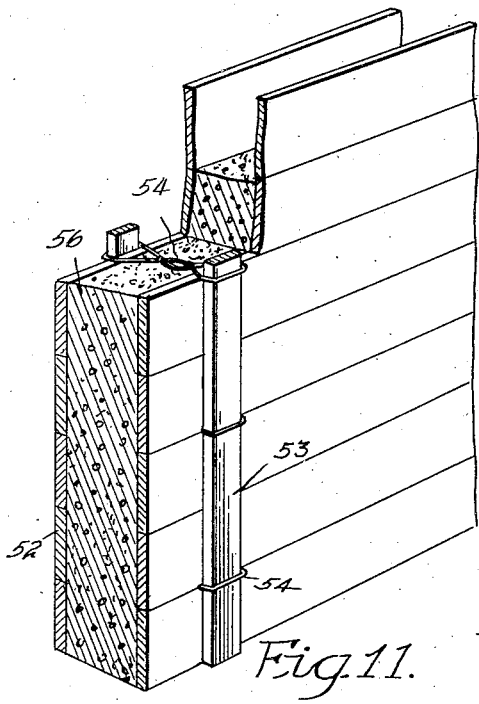
Fig. 11 is a view in perspective illustrated similarly to Fig. 10 showing the common use of a wire in supporting opposite mold sides from spreading apart.
Figure 10:
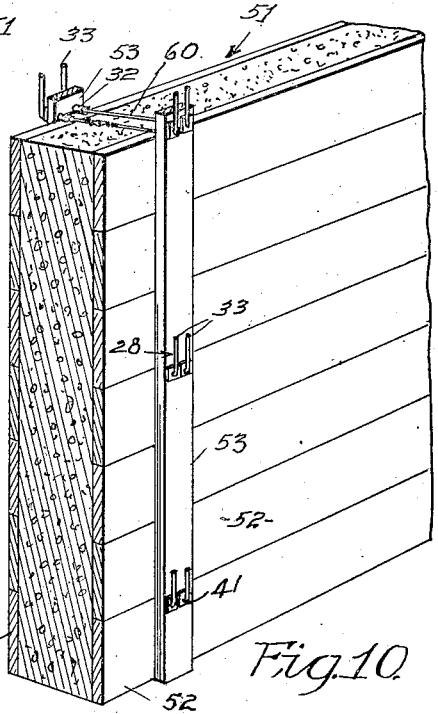
Fig. 10 is a view in perspective showing the anchoring device of Fig. 1 in a mold form in which wire is used in connection with the anchoring device to support opposite mold sides from spreading apart.

With reference to Fig. 10 the anchoring device 28 is illustrated with another form of mold 51 including a pair of opposite separable side members 52. These side members are usually comprised of flat boards extended in one direction adjacent each other and connected together by 2 x 4 members or the like 53 positioned in a direction normal to the flat boards. In the ordinary use of the mold 51 a wire 54 is looped about opposite members 53 between adjacent boards in a side 52 and the free ends of the wire are connected together between the sides 52 as illustrated in Fig. 11. The portions of the wire between the sides 52 are then twisted together by the insertion therebetween of a rod (not shown) and the turning of the rod to tension the wire and thus draw the side members 52 toward each other to hold them against outward movement. When the sides 52 are thus connected by the wire 54 on pouring concrete or like material in the mold 51, any outward movement of the sides 52 away from each other, as produced by the weight of the concrete, cannot be overcome or opposed by increasing the tension in the wire 54 since the wire is substantially within the mold 51 and buried in the poured material. Further, the wire ends which are looped about the members 53 are generally unable to be twisted for wire tensioning purposes. As a result the final molded form 56 is of an irregular shape and at least different from the shape contemplated in the original setting of the mold 51.

Figure 12:
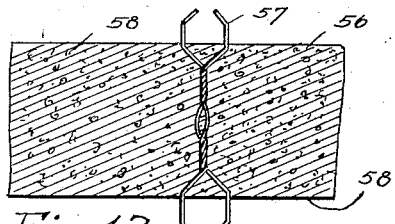
Fig. 12 is a fragmentary detail view showing the wire of Fig. 11 as it appears when the mold sides are removed from the molded form.

A further disadvantage in the use of a wire 54 as shown in Fig. 11 for holding the mold sides 52 against spreading, is found in the fact that in order to remove the sides 52 from the molded form 56 the wire 54 is cut at the members 53 and the sides pulled away from the form. The wire ends 57 (Fig. 12) thus protrude from the form 56 and must be cut off and filed so as to be substantially flush with the sides 58 of the form 56. These objections in the use of a wire 54 for the purpose above explained are overcome by the use of the anchoring device 28.

Figure 14:
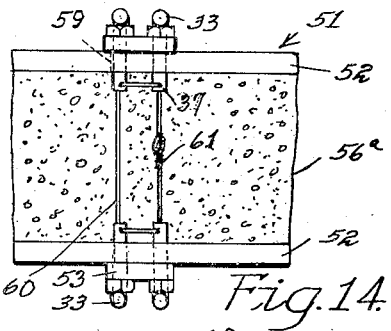
Fig. 14 is a plan view of the molding apparatus in Fig. 10 showing the assembly of four anchoring devices of Fig. 1 therein in a wire supporting position.

Thus as shown in Figs. 10 and 14 a left and right-hand anchoring device are loosely and rotatably extended in corresponding spaced holes 59 through a side 52 at a member 53, with a pair of such devices being located opposite each other in the mold 51. It is apparent, of course, that the anchoring devices 28 can be arranged in pairs opposite each other in the mold 51 anywhere desired in the sides 52. With the anchoring devices 28 in a wire-engaging position, as was fully described in connection with Figs. 3 and 6, a wire 60 is strung through the hook portions 37 of the anchoring devices and the wire tied at its free ends within the mold 51 as indicated at 61. The adjusting nuts 41 are then tightened against corresponding mold sides 52 to tension the wire 60 and in turn draw the sides 52 toward each other to a predetermined position. On pouring of concrete or like material into the mold 51, in the event the sides 52 spread apart, it is only necessary to adjust the nuts 41 to further increase the tension in the wire 60 and in turn move the sides 52 inwardly toward each other to their initial predetermined position. The form 56a is thus capable of being molded to a desired shape since the adjustment of the nuts 41 can be made any time up to the time the concrete becomes self-supporting.

Figure 13:
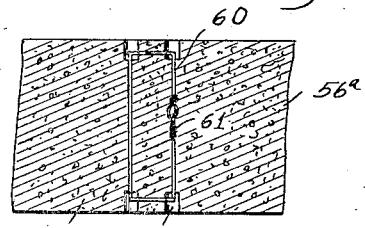
Fig. 13 is a fragmentary detail view showing the wire of Fig. 10 as it appears when the mold sides are removed from the molded form.

When the concrete is substantially self-supporting, but before it is set, the anchoring devices 28 are manipulated to a wire-releasing position and withdrawn from the mold 51 in all respects the same as was described in connection with the mold 15 in Figs. 2 and 3, and the sides 52 are removed from the form 56a. The form 56a thus appears as shown in Fig. 13, with the wire 60 entirely embedded within the form 56a and with small openings 62 in the form sides 63 where the anchoring devices were extended into the mold 51. The anchoring devices 28 thus provide for a complete embedding of the wire 60 within the molded form 56a so as to eliminate the cutting and filing of the wire as is now required when the wire is used alone as explained in connection with Figs. 11 and 12. Also by virtue of the adjustment of an anchoring device laterally of a side member 52 the adjustment of the tension in the wire 60 may be made at any time prior to the concrete becoming self-supporting so that the final shape of the form 56a is capable of being positively controlled.

In Fig. 15 there is illustrated the use of only a pair of anchoring devices 28 for tensioning a wire 64 therebetween. A single anchoring device is extended through a corresponding side 52 in positions opposite each other, with one of such devices being of a left-hand construction and the other of a right-hand construction. When the devices 28 are in a wire-engaging position the wire 64 is strung between the hook portions 37 thereof with the free ends of the wire connected together as indicated at 66. The remaining operation of the devices 28 in Fig. 15 is similar in all respects to their operation in Fig. 14 so that a further description of such operation is believed to be unnecessary.

From a consideration of the above description it is seen that the invention provides an improved method and apparatus for embedding a wire in a moldable material capable of becoming hardened such that the wire is embedded in a predetermined pattern and with portions thereof being freely accessible for connection with an outside circuit. Further, the invention provides a molding apparatus in which embedding of the wire in a moldable material is accomplished concurrently with the use of the wire in adjustably supporting opposite sides of a mold against separation. The complete molding apparatus is comprised of but a minimum number of parts which are inexpensively and readily constructed and capable of being quickly and efficiently operated.

Although the invention has been described with respect to preferred embodiments thereof it is to be understood that it is not to be so limited since modifications can be made therein which are within the full intended scope of this invention as defined by the appended claims.

We claim:

1. Apparatus for embedding a flexible member in a pourable material capable of becoming solidified comprising a form having side members, means for releasably supporting said flexible member in a predetermined pattern within said form including a plurality of anchoring devices detachably and rotatably carried in certain of said side members, with each of said anchoring devices having a straight body member with one end portion located inside of said form, a hook at said one end portion within the peripheral confines of said body member and comprised of a transverse groove, and a longitudinal groove open to one end of said transverse groove and to the free end of said one end portion, with said flexible member being extended through said two grooves for engagement with said hook, and means for retaining said anchoring device in a fixed position at which said hook is engaged with said flexible member, said anchoring device being rotatable in one direction, when the pourable material is in a partially solidified state, to move said hook out of an engaged position with said flexible member to provide for the free removal of said one end portion outwardly from said form.

2. Apparatus for embedding a wire member in a pourable material capable of becoming solidified, comprising a form having side members, a plurality of devices for releasably holding said wire within said form, each of said devices including a straight body member having one end portion loosely and rotatably extendible through a side member within said form, said one end portion having a hook engageable with said flexible member and comprised of a continuous peripheral groove including a longitudinal section and a transverse section, with said flexible member being extended through said groove, and means for adjustably moving said body member relative to a corresponding side member to place said flexible member under tension, said body member being rotatable in one direction, when the pourable material is in a partially solidified state, to move said hook out of an engaged position with said flexible member to provide for the removal of said body member from within said form.

3. Apparatus for embedding a wire in a moldable material capable of becoming hardened including a mold having a side member with an opening therein, a wire anchoring device for releasably supporting said wire within said mold comprising a body member of straight form having one end portion rotatable in and loosely extendible through said opening into said mold, a transverse hook at said one end portion within the peripheral confines of said body member for engaging said wire, said hook having a longitudinal groove adapted to receive said wire from the hook opening and connected with the hook opening adjacent the bottom thereof, a threaded portion adjacent the other end of said body member, a member threadable on said threaded portion in bearing engagement with the outer surface of said side member to adjustably move said body member outwardly from said side member to tension said wire, said anchoring device being rotatable in one direction, when said moldable material is in a partially solid state, to move said hook out of engagement with said wire to provide for the withdrawal of said anchoring device out of said mold through said side member opening.

4. A rotatable anchoring device for releasably supporting a wire member under tension comprising a straight body member having a transverse peripheral groove adjacent one end thereof constituting a hook for engaging said wire member, and a longitudinal groove open to said one end of the body member and to one end of said transverse groove, said longitudinal groove being adapted to receive the wire extended from said one end of the transverse groove, with said wire being released from said hook on rotation of said body member in a direction such that said one end of the transverse groove trails the other end of said transverse groove.

5. A rotatable anchoring device for releasably supporting a wire under tension comprising a straight body member having a continuous peripheral groove at one end, with said groove including a transverse section, and a longitudinal section extended between said one end of the body member and one end of said transverse section, with the junction of said two sections being of a round contour, said wire being received in said groove and engaged at said transverse section, said wire being released from said groove on rotation of said body member in a direction such that the one end of said transverse groove trails the other end thereof.

LESLIE W. MILLER.
SAMPSON DEWEY MAHLSTADT.